United States Patent [19]

Ishida et al.

[11] Patent Number: 4,551,662

[45] Date of Patent: Nov. 5, 1985

[54] MOTOR SPEED DETECTING DEVICE

[75] Inventors: Hiroshi Ishida, Tokyo; Mitsuyuki Taniguchi, Hino, both of Japan

[73] Assignee: Fanuc Ltd, Yamanashi, Japan

[21] Appl. No.: 711,535

[22] PCT Filed: Jul. 11, 1984

[86] PCT No.: PCT/JP84/00358

§ 371 Date: Mar. 6, 1985

§ 102(e) Date: Mar. 6, 1985

[87] PCT Pub. No.: WO85/00430

PCT Pub. Date: Jan. 31, 1985

[30] Foreign Application Priority Data

Jul. 11, 1983 [JP] Japan .................. 58-124822

[51] Int. Cl.⁴ .................. H02P 5/00; G05B 5/00
[52] U.S. Cl. .................. 318/316; 318/314; 318/327; 318/341; 318/466
[58] Field of Search .............. 318/138, 139, 245, 254, 318/257, 311, 312, 313, 314, 316, 317, 318, 320, 326, 327, 328, 341, 345, 603, 605, 615, 616, 617, 618, 628, 439, 640

[56] References Cited

U.S. PATENT DOCUMENTS

| | | | |
|---|---|---|---|
| 3,833,843 | 9/1974 | Bossons | 318/443 X |
| 3,851,682 | 12/1974 | Vogel et al. | 318/603 X |
| 4,032,826 | 6/1977 | Jahnke et al. | 318/317 X |
| 4,061,950 | 12/1977 | Kayanuma | 318/318 X |
| 4,216,419 | 8/1980 | Van Dam et al. | 318/327 |
| 4,353,020 | 10/1982 | Veale | 318/603 X |
| 4,366,421 | 12/1982 | Eto et al. | 318/603 X |
| 4,468,597 | 8/1984 | Baumard et al. | 318/317 |

Primary Examiner—William M. Shoop, Jr.
Assistant Examiner—Paul Shik Luen Ip
Attorney, Agent, or Firm—Armstrong, Nikaido, Marmelstein & Kubovcik

[57] ABSTRACT

Disclosed is a motor speed detecting device which comprises a first slotted disc (3) having one slot and mounted on a rotational shaft (2) of a motor (1) that is driven by a motor drive unit (7) and a second disc (4) having a plurality of slots, a first magnetic sensor (5) mounted on the first gear (3) in close proximity thereto and outputting two signals with a phase difference and a second magnetic sensor (6) mounted on the second slotted disc in close proximity thereto and outputting two signals with the phase difference and their inverted signals and a detector circuit (8) receiving the output of the first and the second magnetic sensors. The detector circuit (8) is provided, wherein two outputs from the first magnetic sensor are compared with a differential amplified voltage and a reference voltage, one pulse per one revolution of the rotational shaft (2) is output, and in addition, with the four outputs provided from the second magnetic sensor (6), differential amplification, inverting amplification, comparison and vector synthetic comparison are implemented to provide a pulse per 22.5 degrees, where the phase of the output waveform in the magnetic sensor in response to the width of the slot, resulting in a sinusoidal wave having a different phase by 90 degrees from each other, in response to the number of the slots of the second disc (4), and a square wave of as many as four times the frequencies as the number of slots of the second disc (4) and a square wave of one-fourth period of phase difference with regard to the square wave, are provided to output therewith. Thus, using the relevant device, it is applicable to a to-be-detected rotational shaft of which the rotational shaft (2) is hollow and to provide a precision of detection four times as great.

1 Claim, 9 Drawing Figures (1)

(2)

(3)

MOTOR SPEED DETECTING DEVICE

TECHNICAL FIELD

The present invention relates to a motor speed detecting device, and more particularly, to a motor speed detection device utilizing a magnetic sensor and a slotted disc having an undercut notched wedge and mounted on the rotational shaft of the motor.

BACKGROUND ART

In the prior art, a motor speed detecting device comprises a coded disc composed of a glass plate mounted on the rotational shaft of the motor, and as an opaque portion of the coded disc passes between a light source and a light sensor, an electrical signal is obtained from the light sensor. The electric signal is then amplified to shape the waveform, thus providing a series of pulses in response to the rotational speed of the shaft. Usually, this device outputs two types of pulses, that is to say, one pulse per one revolution of the coded disc and a plurality of pulses per one revolution of the coded disc. The device counts the number per hour of these pulses, and thus detects the rotational speed of the motor.

There is an unavoidable problem wherein, when the detected rotational shaft is hollow, the above-described speed detection device cannot be applied. When a motor is used for driving a machine tool such as a lathe and the like, it is necessary to render a drive rotational shaft hollow and to make a cylindrical workpiece pass therethrough, on the basis of the mechanism for delivering the workpiece. In such a case, the apparatus using the coded disc cannot be adapted from the structural point of view, although it is recognized that the interference from other sources of light considerably affects for the worse the apparatus using the coded disc, and there remains a problem in that the precision of the device cannot always be maintained.

The present invention is intended to solve the problems described in the above prior art devices.

DISCLOSURE OF THE INVENTION

It is an object of the present invention to provide a speed detection device that, when used for a hollow rotational shaft such as in a lathe, it is possible to improve the precision of detection in response to the number of slots of the slotted disc by approximately four times without increasing the number of slots.

According to a feature of the present invention, there is provided a motor speed detecting device comprising, a first disc composed of ferromagnetic material, having one slot and mounted on the rotational shaft of a motor driven by a motor drive unit; a second disc composed of ferromagnetic material, having a plurality of slots; a first magnetic sensor mounted in close proximity to the first disc, for outputting two signals having a phase difference responsive to the width of the notched disc by one half; a second magnetic sensor mounted in close proximity to the second disc, for outputting two signals having the phase difference responsive to the width of the slot by one half, and two other signals in phase with the signals inverted by the first two signals; and a detector circuit for receiving the outputs of the first and second magnetic sensors and detecting those outputs.

The detector circuit comprises, a first differential amplifier circuit for counting the difference between the two signals from the first magnetic sensor, a first comparator circuit for comparing the output from the first differential amplifier circuit with a reference voltage, a second differential amplifier circuit and a third differential amplifier circuit for receiving respectively two sets of signals having an opposite phase relationship to each other from the second magnetic sensor and counting the difference therebetween, a vector synthetic comparator circuit for receiving the outputs of the second and third differential amplifier circuit and searching for the signals having each phase of 0, 22.5, 45, 67.5, 90, 112.5, 135 and 157.5 degrees, at a phase difference of 22.5 degrees, separately, and when the phase angle of the output waveform of the magnetic sensor in response to the width of the slot is 180 degrees, then comparing the signals with the reference voltage to make a series of eight rectangular waves, a logic circuit for operating the output of the vector synthetic comparator circuit logically, a first inverting amplifier circuit for inverting and amplifying the output of the second differential amplifier circuit, and a second inverting amplifier circuit for inverting and amplifying the output of the third differential amplifier circuit, wherein the sinusoidal wave output of the first and second inverting amplifier circuit is rendered to control the motor through the motor drive unit and to provide one pulse per one revolution of the rotational shaft to the output of the first comparator circuit, to provide a rectangular wave four times as large as the frequency in response to the number of slots of the second disc to the output of the logic circuit and to provide a rectangular wave having a phase difference of the period by one quarter to the rectangular wave.

BEST MODE FOR CARRYING OUT THE INVENTION

Figure 1:
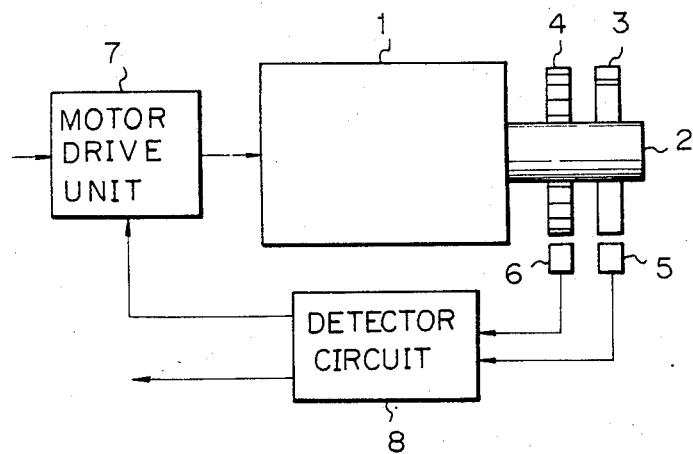
FIG. 1 is a block diagram of the constitution of a motor speed detecting device according to an embodiment of the present invention.
Figure 2:
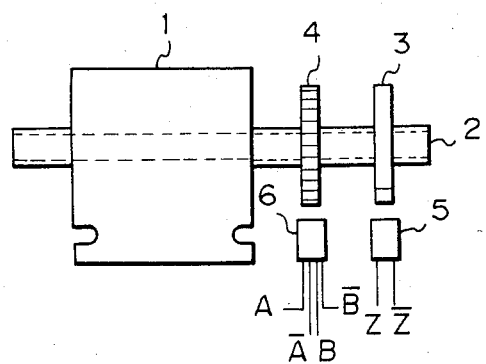
FIG. 2 is a diagram showing a slotted disc and magnetic sensor portion in FIG. 1.

The constitution of the motor speed detecting device and the slotted disc and magnetic sensor portion thereof are shown respectively in FIG. 1 and FIG. 2 in accordance with an embodiment of the present invention. The device comprises a motor 1 having a rotational shaft 2, a first slotted disc 3, a second slotted disc 4, a first magnetic sensor 5, a second magnetic sensor 6, a detector circuit 8, and a motor drive unit 7.

Figure 3:
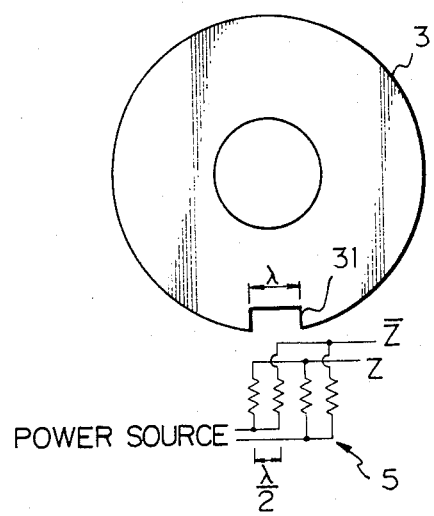
FIG. 3 is a diagram showing the first slotted disc and the first magnetic sensor in FIG. 2.

The discs 3 and 4 are composed of ferromagnetic materials and are fixed to the rotational shaft 2. A slot 31 is cut in the disc 3, as shown in FIG. 3. The magnetic sensor 5 is mounted opposite to the disc 3. The magnetic sensor 5 contains a magnetic resistance effect element (denoted by a resistor symbol in the figure) and a permanent magnet (not shown). When the width of the slot 31 is taken as λ, the magnetic resistance effect element is arranged in the peripheral direction of the disc 3 by a spacing of λ/2. The permanent magnet is disposed in relation to the disc 3 to sandwich therebetween the magnetic resistance effect element. When the slot of the disc 3 is opposite the permanent magnet, it is likely to weaken a magnetic field that is provided to the magnetic resistance effect element. The magnetic resistance effect element has the property of varying the value of an electric resistance in response to the strength of the magnetic field. Consequently, when the magnetic resistance effect element is connected in a way such as shown in FIG. 3, and applied to a power source, and the slot of the disc 3 passes by in close proximity to the magnetic sensor 5, both outputs Z and $\bar{Z}$ of the magnetic sensor 5 have a signal waveform as shown in the waveform (1) of FIG. 5.

Figure 4:
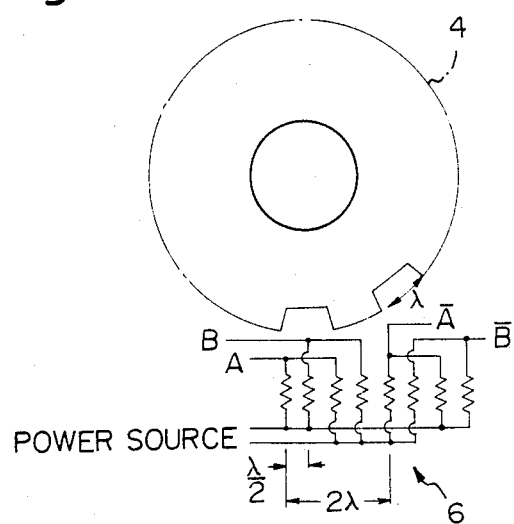
FIG. 4 is a diagram showing the second slotted disc and the second magnetic sensor in FIG. 2.
Figure 5:
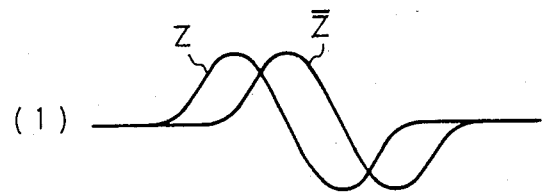
FIG. 5 is a waveform diagram showing the output waveforms of the magnetic sensor in FIG. 2.
Figure 5:
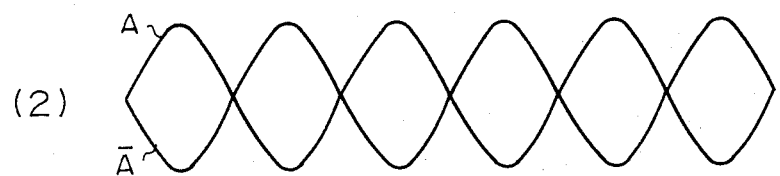
Figure 5:
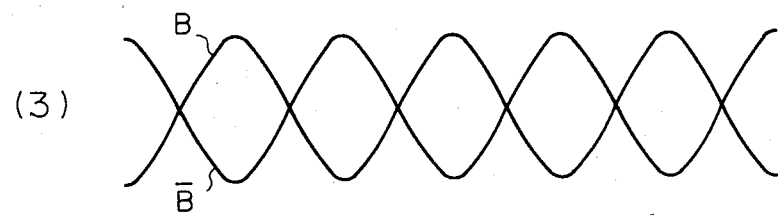

The disc 4 is provided with a plurality of slots as shown in FIG. 4. To simplify the explanation, in the figure the width of the slot is shown enlarged and the slots arranged uniformally around the periphery are shown by chain lines. The magnetic sensor 6 comprises two magnetic resistance effect elements, in comparison with the magnetic sensor 5 of FIG. 3, to provide the inverted outputs having phase angles different by 180 degrees $\bar{A}$ and $\bar{B}$ of the A and B outputs, other than A and B outputs in response to the Z and $\bar{Z}$ outputs of the magnetic sensor 5. If the width of wedge is λ, as shown by the resistance symbol in FIG. 4, in the set of elements providing A and B outputs each element is arranged with a spacing of λ/2, in a set of elements providing $\bar{A}$ and $\bar{B}$ outputs each are arranged, for instance, with a spacing of λ/2, and the power source is connected in opposite polarity therewith, to be further arranged with a spacing of 2λ to a set of the elements. In this way, with the output of the magnetic sensor 6, an output is provided such as the waveforms (2) and (3) as shown in FIG. 5. The passage of the disc 4 in the neighbourhood of a permanent magnet causes the magnetic field to vary; this is the same operational principle, in which the resistance value of the magnetic resistance effect element is changed to provide an output signal, as that in the case of the disc 3 and the magnetic sensor 5.

Figure 6A:
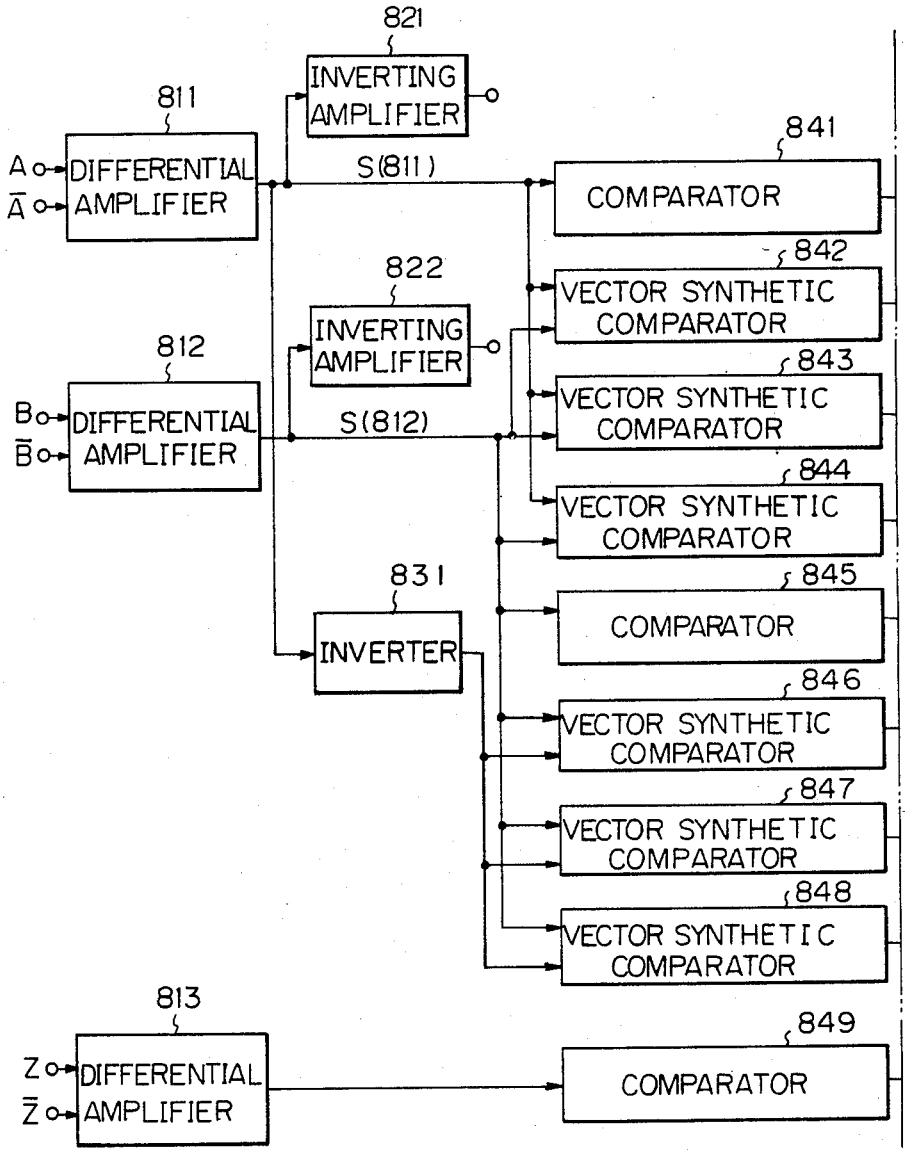
FIGS. 6A and 6B are block circuit diagrams of each detector circuit in FIG. 1.
Figure 6B:
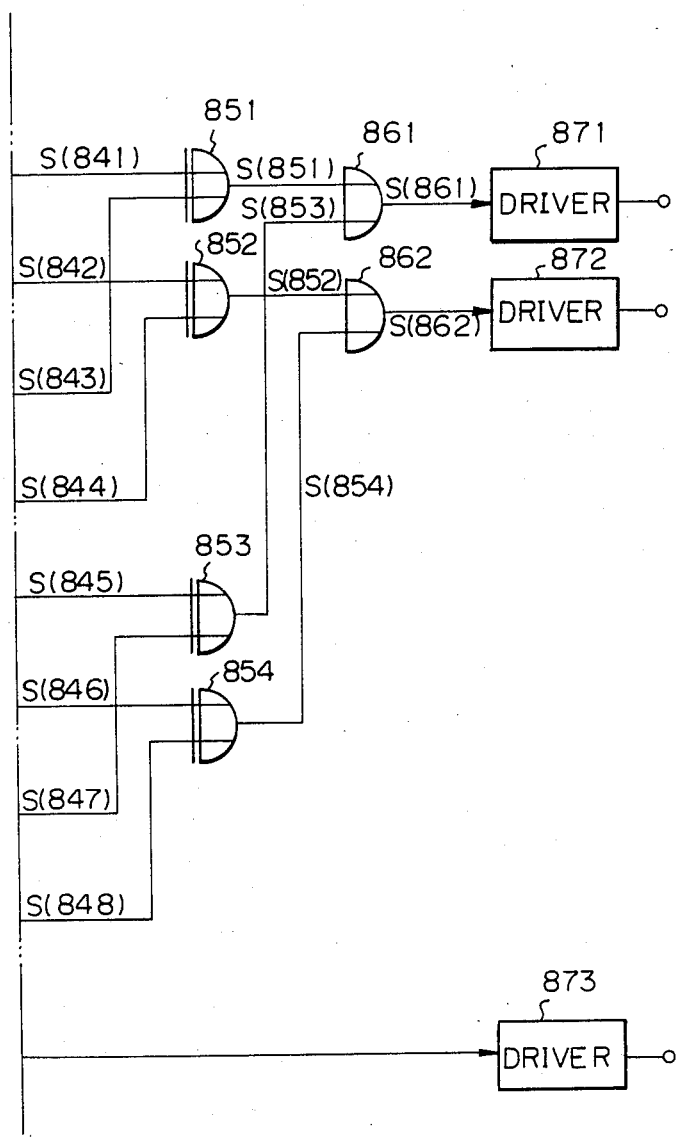

A block circuit diagram of the detector circuit 8 is shown in FIG. 6A and FIG. 6B. The outputs Z and $\bar{Z}$ from the magnetic sensor 5 are supplied to a differential amplifier 813 as the first differential amplifier circuit to provide the difference signal. The difference signal is compared with a reference voltage, for instance, 2.5 V, in a comparator 849 as the first comparator circuit, so one rectangular wave per one revolution of the disc is output through a driver 873.

The outputs A and $\bar{A}$ from the magnetic sensor 6 are applied to a differential amplifier 811 as the second differential amplifier circuit to count the difference, and are then supplied to a vector synthetic comparator 846 to 848 forming a vector synthetic comparator circuit, through a comparator 841, vector synthetic comparators 842 to 844 forming a vector synthetic comparator circuit, and an inverter 831. The outputs B and $\bar{B}$ from the magnetic sensor 6 are applied to a differential amplifier 812 as the third differential amplifier circuit to count the difference, and are then supplied to a comparator 845 and vector synthetic comparators 842 through 844, and 846 through 848 forming the vector synthetic comparator circuit.

Figure 7:
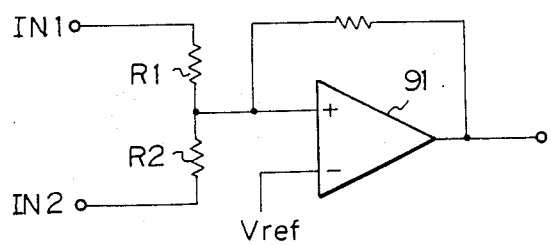
FIG. 7 is a circuit diagram of a vector synthetic comparator in FIGS. 6A and 6B.

Each vector synthetic comparator 842, 843, 844, 846, 847, and 848 comprises an operational amplifier 91 and resistors respectively as shown in FIG. 7. The resistance values differ in each vector synthetic comparator. Considering the phase of the output signal S' (811) of the differential amplifier 811 as a reference, as the output signal S (812) of the differential amplifier 812 has a phase difference of 90 degrees, these two signals S (811) and S (812) are added with a proper amplitude ratio to provide a signal of a desired phase difference. That is to say, when the signal S (811) of a phase difference of 0 degrees is applied to an input terminal IN1, and the signal S (812) of a phase difference of 90 degrees to an input terminal IN2, as shown in FIG. 7, then if the resistance of resistor R1 and the resistance of resistor R2 are selected to satisfy the equation:

$$R1/R2 = \tan 22.5°$$

a signal having a phase difference of 22.5 degrees is applied to the input of the operational amplifier 91 and compared with a reference voltage ($V_{ref}$), for instance, 2.5 V, to output the rectangular signal having a phase difference of 22.5 degrees. A vector synthetic comparator 843 selects the resistor R1 and R2 so as to satisfy the equation:

$$R1/R2 = \tan 45° = 1$$

to provide a rectangular wave signal having a phase difference of 45 degrees at the output. On the other hand, a vector synthetic comparator 844 selects a resistor R1 and R2 so as to satisfy the equation:

$$R1/R2 = \tan 67.5°$$

to provide a rectangular wave signal having a phase difference of 67.5 degrees at the output.

The signal S (812) is applied to the input IN1 of the vector synthetic comparator 846 and an inverted signal of the signal S (811) to the input IN2 through an inverter 831, so the resistors R1 and R2 are selected so as to satisfy the equation;

$$R2/R1 = |\tan 112.5°|$$

to provide a rectangular wave signal having a phase difference of 112.5 degrees at the output. Similarly a vector synthetic comparator 847 selects resistors R1 and R2 so as to satisfy the equation:

$$R2/R1 = |\tan 135°| = 1$$

to provide a rectangular wave signal having a difference of 135 degrees. A vector synthetic comparator 848 selects resistors R1 and R2 so as to satisfy the equation:

$$R2/R1 = |\tan 157.5°|$$

to provide a rectangular wave having a phase difference of 157.5 degrees at the output. The signal S (811) is applied to the comparator 841, and compared with the reference voltage, to output a rectangular wave having a phase difference of zero degrees, while the signal S (812) is supplied to the comparator 845, to output a rectangular wave having a phase difference of 90 degrees.

Figure 8:
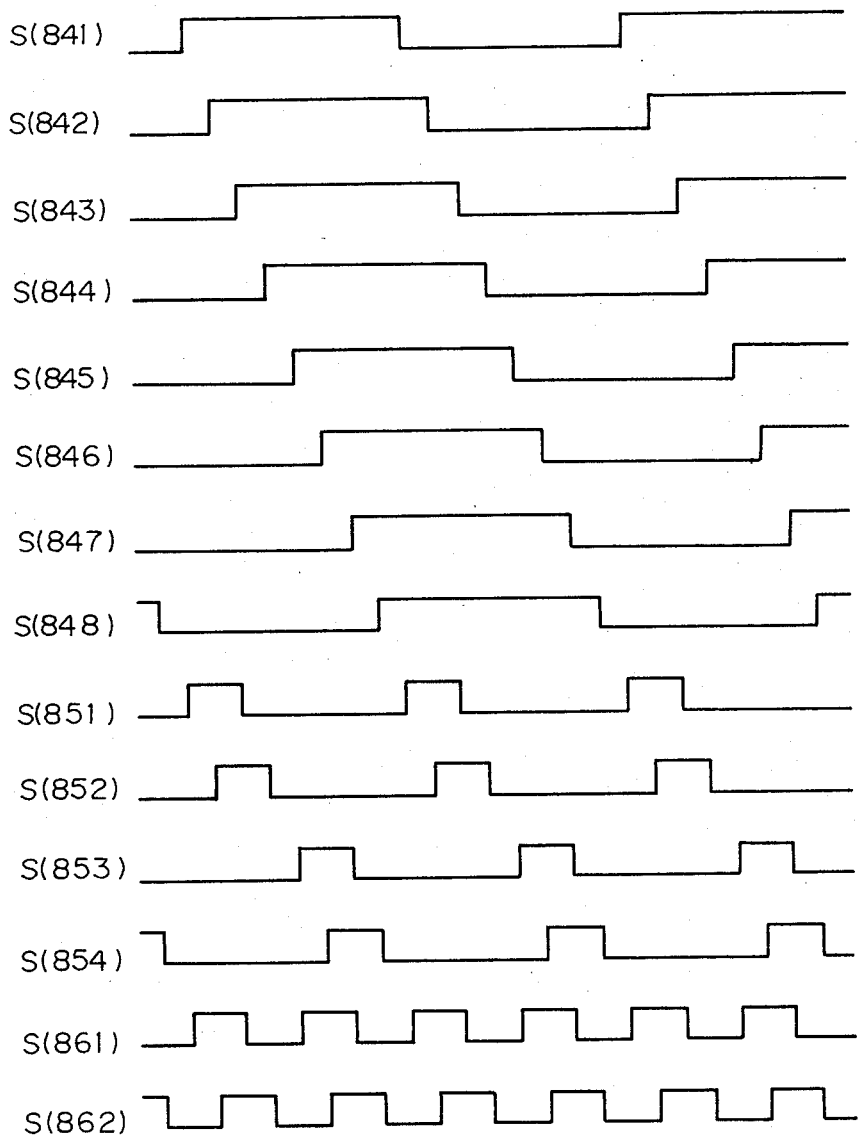
FIG. 8 is a waveform diagram showing the waveforms of signals in the circuits of FIGS. 6A and 6B.

If the output signals of the above-mentioned vector synthetic comparator 842 to 844 are respectively S (842)

to S (844), the output signals of the vector synthetic comparator 846 to 848, respectively S (846) to S (848), and the output signals of the comparator 841 and 845, respectively S (841) and S (845), the waveforms of the signals S (841) to S (848) are as shown in FIG. 8.

The signals S (841) and S (843) are applied to the exclusive OR gate 851 to provide an output signal S (851). The signals (842) and S (844) are applied to the exclusive OR gate 852 to provide an output signal S (852). The signals S (845) and S (847) are applied to the exclusive OR gate 813 to provide an output signal S (853). The signals S (846) and S (848) are applied to the exclusive OR gate 854 to provide an output signal (854).

The signals S (851) and S (853) are applied to the OR gate 861 to provide the output signals S (861). The signals (852) and S (854) are applied to the OR gate 862 to provide the output signal S (862). The waveforms of the above-mentioned signals S (851) to S (854), S (861) and S (862) are as shown in FIG. 8.

If the signal S (861) is compared with the signal S (84) derived from the signals A and $\overline{A}$, the frequency is four times larger and there is a phase difference of 90 degrees between the signal S (861) and the signal S (862). The signals S (861) and S (862) are supplied respectively through the driver 871 and 872 as the output of the detector circuit 8. Additionally, the signal S (811) is output through the inverting amplifier 821 as the first inverting amplifier circuit to provide the sinusoidal wavesignal to the above-mentioned motor drive unit 7, while the signal S (812) is output through the inverting amplifier 822 as the second inverting amplifier circuit to provide the sinusoidal wave signal to the motor drive unit 7 in the same manner.

As mentioned above, according to an embodiment of the present invention, there is provided one pulse per one revolution of the rotational shaft of the motor, the sinusoidal wave signal per one revolution being equivalent to the number of slots of the slotted disc having a plurality of slots mounted on the rotational shaft, the sinusoidal wave signal having the phase difference of 90 degrees to the sinusoidal signal and the rectangular wave signals having the phase difference of 90 degrees to each other at four times the frequencies of the sinusoidal signals.

We claim:

1. A motor speed detecting device comprising:
   a first slotted disc composed of ferromagnetic material, having one slot and being mounted on the rotational shaft of a motor driven by a motor drive unit;
   a second slotted disc composed of ferromagnetic material, having a plurality of slots;
   a first magnetic sensor mounted in close proximity to said first slotted disc, for outputting a first pair of signals having a phase difference in response to the width of said slot by one half;
   a second magnetic sensor mounted in close proximity to said second slotted disc, for outputting a second pair of signals having a phase difference in response to the width of said slot by one half, and also for outputting a third pair of signals inverted with respect to said second pair of signals; and
   a detector circuit for receiving the outputs of said first and second magnetic sensors and for detecting said outputs;
   said detector circuit comprising:
   a first differential amplifier circuit for counting the difference between said first pair of signals from said first magnetic sensor;
   a first comparator circuit for comparing the output from said first differential amplifier circuit with a reference voltage;
   a second differential amplifier circuit and a third differential amplifier circuit for receiving respectively said second and third pairs of signals having an opposite phase relationship to each other from said second magnetic sensor and counting the difference therebetween;
   a vector synthetic comparator circuit for receiving the outputs of said second and third differential amplifier circuits and searching for the signals having each phase angle of 0, 22.5, 45, 67.5, 90, 112.5, 135 and 157.5 degrees at a phase difference of 22.5 degrees respectively, when the phase angle of the output waveform of the magnetic sensor in response to the width of said slot is 180 degrees, then comparing said signals with the reference voltage to make a series of eight rectangular waves;
   a logic circuit for operating the output of said vector synthetic comparator circuit logically;
   a first inverting amplifier circuit for inverting and amplifying the output of said second differential amplifier circuit; and
   a second inverting amplifier circuit for inverting and amplifying the output of said third differential amplifier circuit;
   wherein the sinusoidal wave outputs of said first and second inverting amplifier circuit are rendered to control said motor through said motor drive unit and to provide one pulse per one revolution of said rotational shaft to the output of said first comparator circuit, to provide a rectangular wave of the frequency four times as large as the frequency corresponding to the number of slots of said second disc to the output of said logic circuit and to provide a rectangular wave having a one quarter period of phase difference from said rectangular wave.

* * * * *